United States Patent
Sawada et al.

(10) Patent No.: US 8,339,630 B2
(45) Date of Patent: Dec. 25, 2012

(54) PRINT-ORDER RECEIVING APPARATUS, PRINTING APPARATUS, PRINT-ORDER RECEIVING METHOD, AND COMPUTER PROGRAM THEREOF

(75) Inventors: Koichi Sawada, Kanagawa (JP); Masato Nakamura, Kanagawa (JP); Shigenobu Ohga, Kanagawa (JP); Hirotaka Kano, Kanagawa (JP); Toshiyuki Nagasawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1190 days.

(21) Appl. No.: 11/857,057

(22) Filed: Sep. 18, 2007

(65) Prior Publication Data

US 2008/0074690 A1 Mar. 27, 2008

(30) Foreign Application Priority Data

Sep. 21, 2006 (JP) ................ P2006-256513

(51) Int. Cl.
*G06K 15/00* (2006.01)

(52) U.S. Cl. ...... 358/1.14; 358/1.1; 358/1.13; 358/1.15; 358/1.16; 358/444; 713/182; 713/183; 711/100; 711/115; 711/126; 711/154; 711/163; 711/164

(58) Field of Classification Search ........................ None
See application file for complete search history.

(56) References Cited

U.S. PATENT DOCUMENTS

| | | | |
|---|---|---|---|
| 7,511,850 B2 * | 3/2009 | Ikeda ........................... | 358/1.16 |
| 2005/0068547 A1 * | 3/2005 | Negishi et al. ................. | 358/1.1 |
| 2005/0270554 A1 * | 12/2005 | Aoki ............................ | 358/1.13 |
| 2007/0086036 A1 * | 4/2007 | Tanaka ......................... | 358/1.13 |
| 2007/0103712 A1 * | 5/2007 | Corona ......................... | 358/1.14 |
| 2007/0182986 A1 * | 8/2007 | Ciriza et al. .................. | 358/1.15 |

FOREIGN PATENT DOCUMENTS

| | | |
|---|---|---|
| JP | 10-011398 | 1/1998 |
| JP | 2000-010441 | 1/2000 |
| JP | 2001-092608 | 4/2001 |
| JP | 2003-091507 | 3/2003 |
| JP | 2005-138531 | 6/2005 |

OTHER PUBLICATIONS

Japanese Office Action dated Sep. 9, 2008 for Application No. 2006-256513.

* cited by examiner

*Primary Examiner* — Charlotte M Baker
*Assistant Examiner* — Miya J Cato
(74) *Attorney, Agent, or Firm* — SNR Denton US LLP

(57) ABSTRACT

A print-order receiving apparatus includes a first memory unit for storing an administrator password used to determine whether or not to allow access to administrative information, a second memory unit for storing an order-confirmation password used to determine whether or not to perform printing, a first data-reading unit for reading image data from a first portable recording medium, a password requesting unit for requesting input of the order-confirmation password during an operation of receiving a print-order regarding the read image data, a second data-reading unit for reading password data from a second portable recording medium when the order-confirmation password is requested, and a print-determination unit for checking whether the read password data and the order-confirmation password match and for determining whether or not to print the image data.

15 Claims, 12 Drawing Sheets

FIG. 5

ENTER PASSWORD

| | |
|---|---|
| ORDER NO. | 0012 |
| PRINT SIZE | POST CARD |
| NUMBER OF SHEETS | 1 |
| @ | 15 YEN |
| TOTAL | 15 YEN |
| PRINTABLE NUMBER OF SHEETS | 96 |
| APPROXIMATE PRINTING TIME | 00:00:18 |

BACK

61

| 7 | 8 | 9 |
|---|---|---|
| 4 | 5 | 6 |
| 1 | 2 | 3 |
| 0 | CLEAR | |

| ORDER-CONFIRMATION PASSWORD |
|---|

FIG. 10B

| INVARIABLE PASSWORD | VARIABLE PASSWORD |
|---|---|

FIG. 11

| ORDER NO. | BUDGET CODE | PRINT SIZE | NUMBER OF SHEETS | TOTAL (¥) |
|---|---|---|---|---|
| 0001 | 001 | POST CARD | 5 | 150 |
| 0002 | 003 | KG | 2 | 60 |

PRINT-ORDER RECEIVING APPARATUS, PRINTING APPARATUS, PRINT-ORDER RECEIVING METHOD, AND COMPUTER PROGRAM THEREOF

CROSS REFERENCES TO RELATED APPLICATIONS

The present invention contains subject matter related to Japanese Patent Application JP 2006-256513 filed in the Japanese Patent Office on Sep. 21, 2006, the entire contents of which are incorporated herein by reference.

BACKGROUND OF THE INVENTION

1. Field of the Invention

The present invention relates to a print-order receiving function, and more particularly, to a print-order receiving apparatus, a printing apparatus, a print-order receiving method, and a computer program thereof.

2. Description of the Related Art

In recent years, printing apparatuses have become increasingly popular. In addition, printing apparatuses rapidly have been becoming smaller and achieving higher performance. This increases the variety of installation sites or usage patterns of such printing apparatuses. For example, dye-sublimation printing apparatuses are used at party venues, event venues, offices, schools, photo studios, or the like.

Thus, a mechanism that identifies authorized users among users has been desired to be mounted in such printing apparatuses with the increase in the variety of installation sites or usage patterns of the printing apparatuses. For example, a mechanism that allows a printing apparatus to become usable only when a password entered from an operation panel is authenticated has been proposed in Japanese Unexamined Patent Application Publication No. 2000-10441.

SUMMARY OF THE INVENTION

However, it is difficult to maintain confidentiality of passwords with a method in which an administrator manually enters the passwords in front of users. In particular, in the case of using a printing apparatus at a party venue or an event venue, the number of print-orders received is large, and entering a password for each print-order is troublesome. Furthermore, maintaining the confidentiality of the passwords is stressful in such a situation.

According to an embodiment of the present invention, a print-order receiving apparatus includes the following elements:

(a) a first memory unit for storing an administrator password used to determine whether or not to allow access to administrative information,
(b) a second memory unit for storing an order-confirmation password used to determine whether or not to perform printing,
(c) a first data-reading unit for reading image data from a first portable recording medium,
(d) a password requesting unit for requesting input of the order-confirmation password during an operation of receiving a print-order regarding the read image data,
(e) a second data-reading unit for reading password data from a second portable recording medium when the order-confirmation password is requested, and
(f) a print-determination unit for checking whether the read password data and the order-confirmation password match and for determining whether or not to print the image data.

According to an embodiment of the present invention, the second portable recording medium storing the order-confirmation password is provided in addition to the first portable recording medium storing the image data. When the order-confirmation password is requested, the password is input electrically from the second recording medium.

This results in input of passwords no longer being performed in front of the public and confidentiality of the order-confirmation password can be more properly secured. In addition, the administrator just gives the second portable recording medium storing the order-confirmation password to each of a plurality of users, and does not manually input the order-confirmation password in front of the public any more.

BRIEF DESCRIPTION OF THE DRAWINGS

FIG. 5 is a view showing an example of a screen for inputting a password;

FIGS. 10A and 10B are views showing an example of a configuration of the order-confirmation password;

FIG. 11 is a view showing an example of a confirmation screen for a print-order in a printing queue.

DESCRIPTION OF THE PREFERRED EMBODIMENTS

A printing apparatus having a print-order receiving function according to an embodiment of the present invention will be described below.

Note that units that are not specifically shown or described herein employ well-known or publicly known technologies in the related art.

The embodiments described below are mere examples of the present invention, and therefore, the present invention should not be limited to the embodiments.

First Embodiment

An exterior of a printing apparatus and basic operations thereof will be described below.

Figure 1:
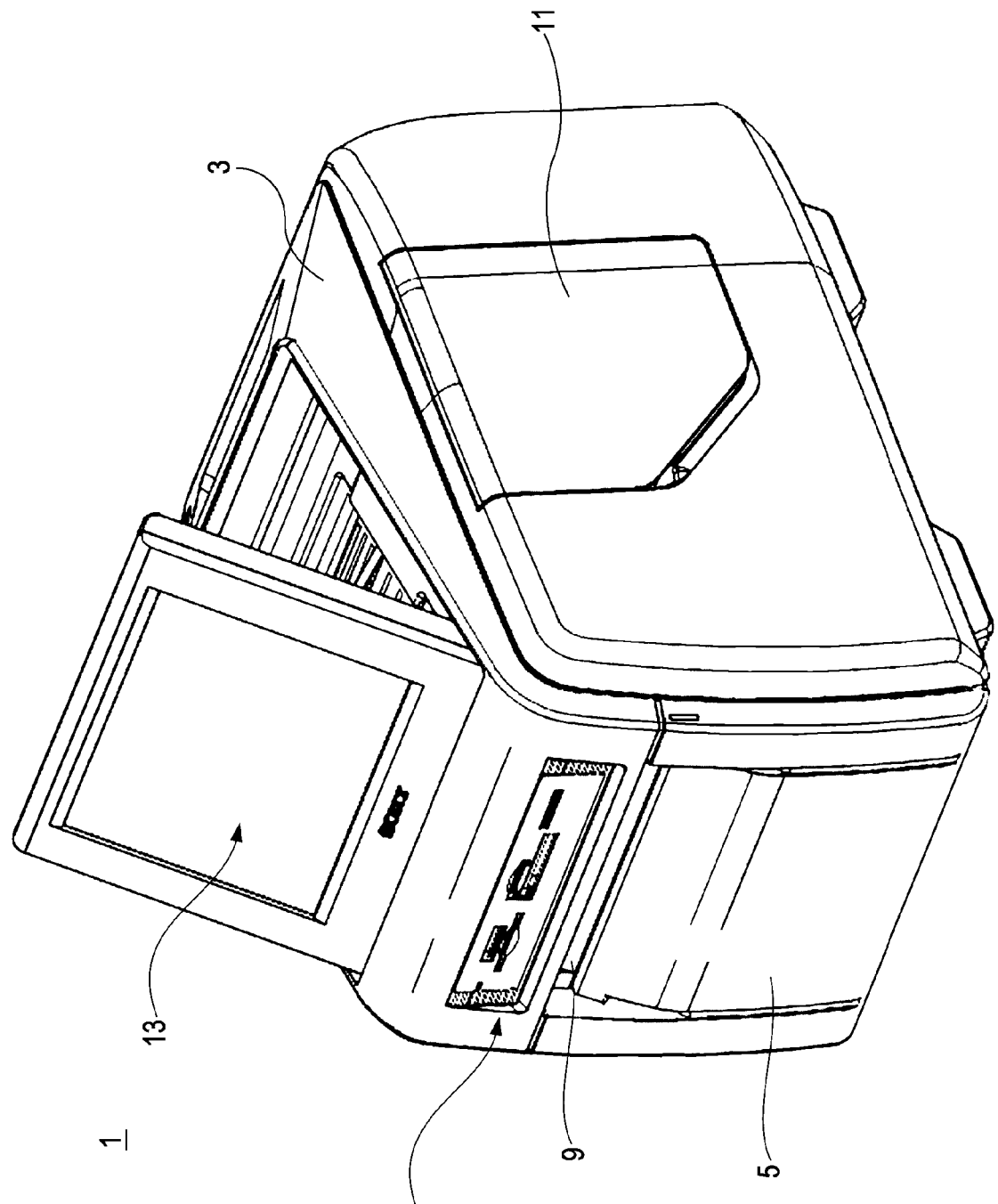
FIG. 1 is a perspective view showing an example of an external configuration of a printing apparatus.

FIG. 1 shows a dye-sublimation printing apparatus 1 which is used in a state isolated from a network (i.e., standalone).

The dye-sublimation printing apparatus 1 includes a feed mechanism for an ink ribbon on which sublimation dye is applied, a thermal head, and a feed mechanism for roll paper (recording paper). The sublimation dye on the ink ribbon is sublimated by thermal energy added to the thermal head, and is transferred and fixed onto the recording paper.

A roll-paper door panel 5, a memory card slot 7, and a recording-paper ejecting gate 9 are provided on the front surface of a housing 3. The roll-paper door panel 5 is used to cover a roll-paper loading gate. Roll paper can be loaded or replaced by opening the roll-paper door panel 5.

As shown in FIG. 1, the memory card slot 7 includes a plurality of slots of different types in order to accept various card-shaped recording media. In a first embodiment, the memory card slot 7 accepts, for example, a Memory Stick®, an extreme digital (XD) card, a secure digital memory card (SD card), a SmartMedia card, and a CompactFlash® card.

A connector connection unit used for external connection (not shown), a switch used for a main power supply (not shown), and the like are provided on the back surface of the housing 3. The connector connection unit is, for example, a universal serial bus (USB) port, and is used to connect a card reader or the like. In the first embodiment, the card reader is used, as appropriate, to accept a memory card storing an order-confirmation password.

An ink-ribbon door panel 11 is provided on one of side surfaces of the housing 3. An ink ribbon can be loaded or replaced by opening the ink-ribbon door panel 11. In the first embodiment, a color-ink ribbon is loaded.

A liquid crystal display (LCD) panel 13 is disposed on the top surface of the housing 3. The LCD panel 13 displays various messages and images, which are used when certain control or printing is performed. For example, password-setting and password-change screens are displayed on an administrative screen. For example, a print size, the number of printouts, a screen for requesting the order-confirmation password, and the like are displayed on a print-order receiving screen.

At the time of setting up for printing, the roll-paper door panel 5 and the ink-ribbon door panel 11 are opened by an administrator, and then roll paper and an ink ribbon are loaded into the printing apparatus 1.

At the time of receiving a print-order, necessary information is input by a user in accordance with an operation screen or a guidance screen displayed on the LCD panel 13.

Here, the user inserts a memory card in which image data is stored (a first recording medium) into one of the memory card slot 7 and an external card reader (not shown).

Moreover, the user also inserts another memory card in which the order-confirmation password is stored (a second recording medium) into the other one of the memory card slot 7 and the external card reader (not shown).

If the order-confirmation password is authenticated, printing is started in accordance with the print-order.

After images are formed on the roll paper by printing, the roll paper is cut into a certain size and ejected through the recording-paper ejecting gate 9.

A functional configuration of the printing apparatus 1 will be described below.

The printing apparatus 1 according to the first embodiment is expected to be used at a party venue, an event venue, or the like. Thus, user authentication through an order-confirmation password is performed in a print-order receiving process so as to allow only authorized users to use the printing apparatus 1.

Figure 2:
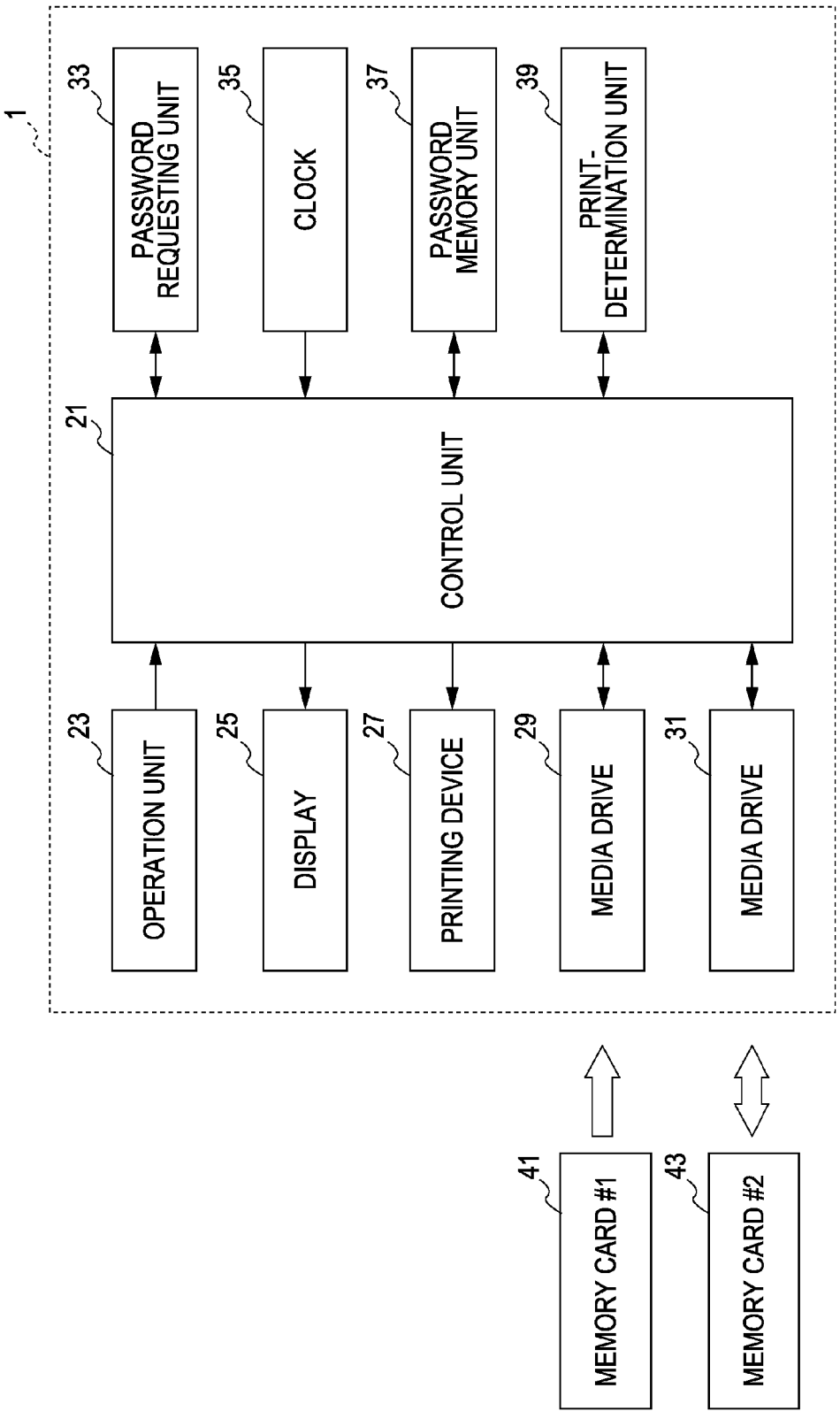
FIG. 2 is a block diagram showing an example of a functional configuration of the printing apparatus.

FIG. 2 shows an example of a functional configuration of the printing apparatus 1 having such an authentication function.

The printing apparatus 1 includes a control unit 21, an operation unit 23, a display 25, a printing device 27, media drives 29 and 31, a password requesting unit 33, a clock 35, a password memory unit 37, and a print-determination unit 39.

The control unit 21 is formed of a computer system, and controls operations for the entire system on the basis of firmware stored in a built-in memory. For example, the control unit 21 performs display processing for a print-order receiving screen or response processing for input operation instructions. A function for authenticating an order-confirmation password and a function for changing an order-confirmation password are also performed by the control unit 21 in combination with other function units.

The operation unit 23 is a touch panel used by the user for inputting operation instructions. The display 25 and the operation unit 23 provided on a surface of the display 25 correspond to the LCD panel 13 of FIG. 1. Operation instructions detected through the operation unit 23 are supplied to the control unit 21.

The display 25 is a display device for displaying various operation screens.

The printing device 27 includes a thermal head, a feed mechanism for recording paper, a feed mechanism for an ink ribbon, and the like.

The media drive 29 is a drive apparatus for reading image data and an order-confirmation password from memory cards 41 and 43. The media drive 29 corresponds to the memory card slot 7 or the card reader (not shown).

Here, the image data is read from the memory card 41 which is portable and carried by the user. The order-confirmation password is read from the memory card 43 which is portable and given to the user by the administrator. That is, in the first embodiment, the order-confirmation password is input through the memory card 43 expressly meant therefor.

Note that the memory cards 41 and 43 may be the same kind or different kinds of recording media.

In either case, read data is supplied to the control unit 21.

Figure 3:
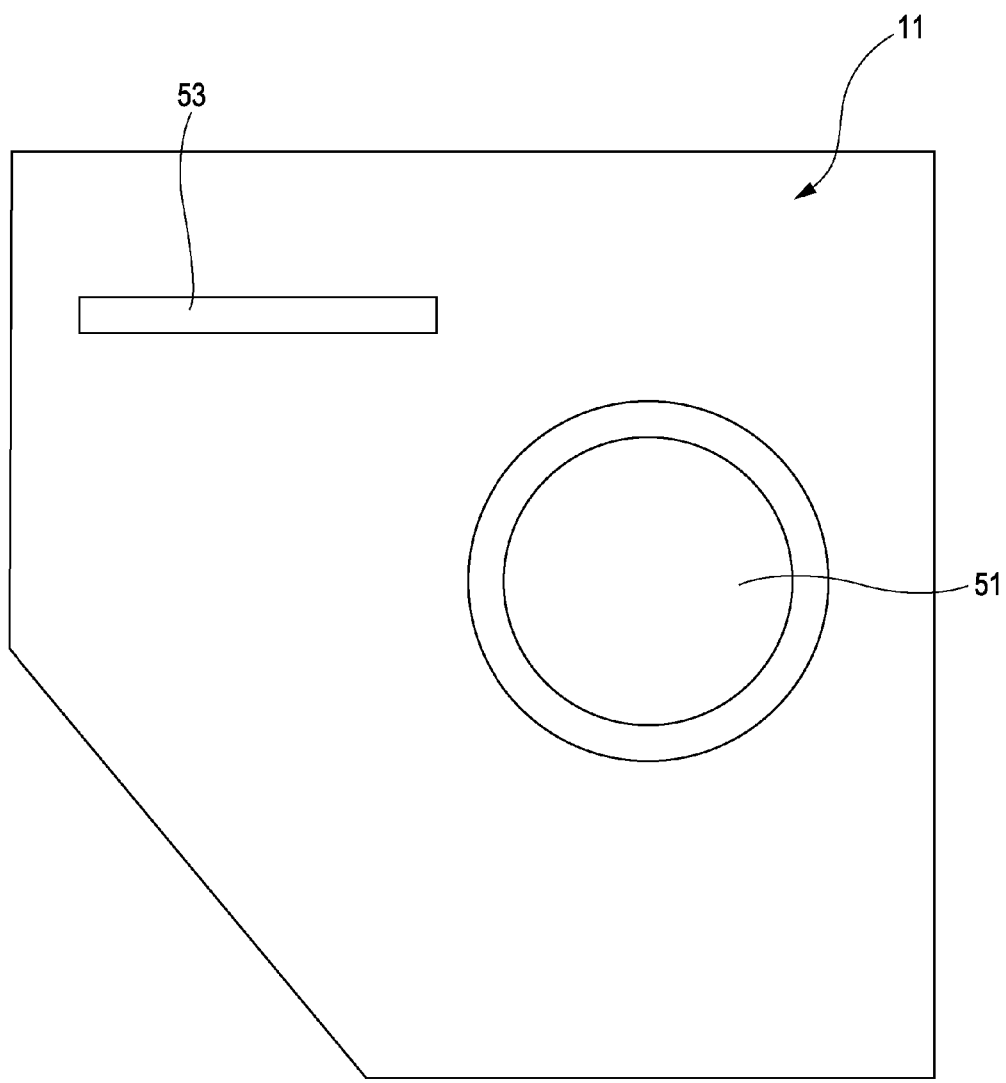
FIG. 3 is a plan view showing an example of a configuration inside an ink-ribbon door panel.

The media drive 31 is a drive apparatus for writing a new password into the memory card 43 if an administrator password or an order-confirmation password is set or changed. As shown in FIG. 3, a slot of the media drive 31 is disposed inside the ink-ribbon door panel 11 in the first embodiment.

FIG. 3 shows an ink-ribbon slot 51 and a memory card slot 53 which corresponds to the media drive 31. In FIG. 3, one memory card slot 53 is shown; however, a plurality of slots may be disposed if there is sufficient room.

As described above, the memory card slot 53 is disposed inside the ink-ribbon door panel 11, and thus, the memory card slot 53 can be hidden from the public during normal usage. Because of this, fraudulent issuance, setting, changing, and the like of the order-confirmation password become more difficult. Note that, such fraudulent issuance, setting, changing, and the like of the order-confirmation password are also prevented logically by the administrator password.

The password requesting unit 33 is a processing device for requesting input of a password when important information is to be accessed. In the first embodiment, the administrator password and the order-confirmation password are requested to be input. Note that the administrator password is requested when the user requests changing of administrative information.

The order-confirmation password is requested when the user requests a print-order be accepted. The screen for requesting the order-confirmation password is displayed, for example, at the time of receiving a print-order or at the time of confirming the print-order in accordance with preset settings.

The clock 35 is used to issue or update the order-confirmation password regularly. The order-confirmation password is issued or updated only when the administrator authenticates that it is okay to do so.

The password memory unit 37 is the whole or a part of a rewritable recording medium for storing the administrator password and the order-confirmation password. For example, a semiconductor memory, a magnetic disk unit, an optical recording medium, or the like is used.

The print-determination unit 39 is a processing device which checks the password read out from the memory card 43, which is inserted into the media drive 29, against the order-confirmation password stored in the password memory unit 37, and determines whether or not to perform printing. If the read password and the order-confirmation password match, the print-determination unit 39 allows performance of printing or continuation of further operations.

In contrast, if the read password and the order-confirmation password do not match, the print-determination unit 39 cancels performance of printing or terminates further operations. Note that, in this case, the password requesting unit 33 displays an operation screen which requests input of a correct password.

Processing operations of the printing apparatus 1 will be described below.

(a) Order Receiving Processing

Figure 4:
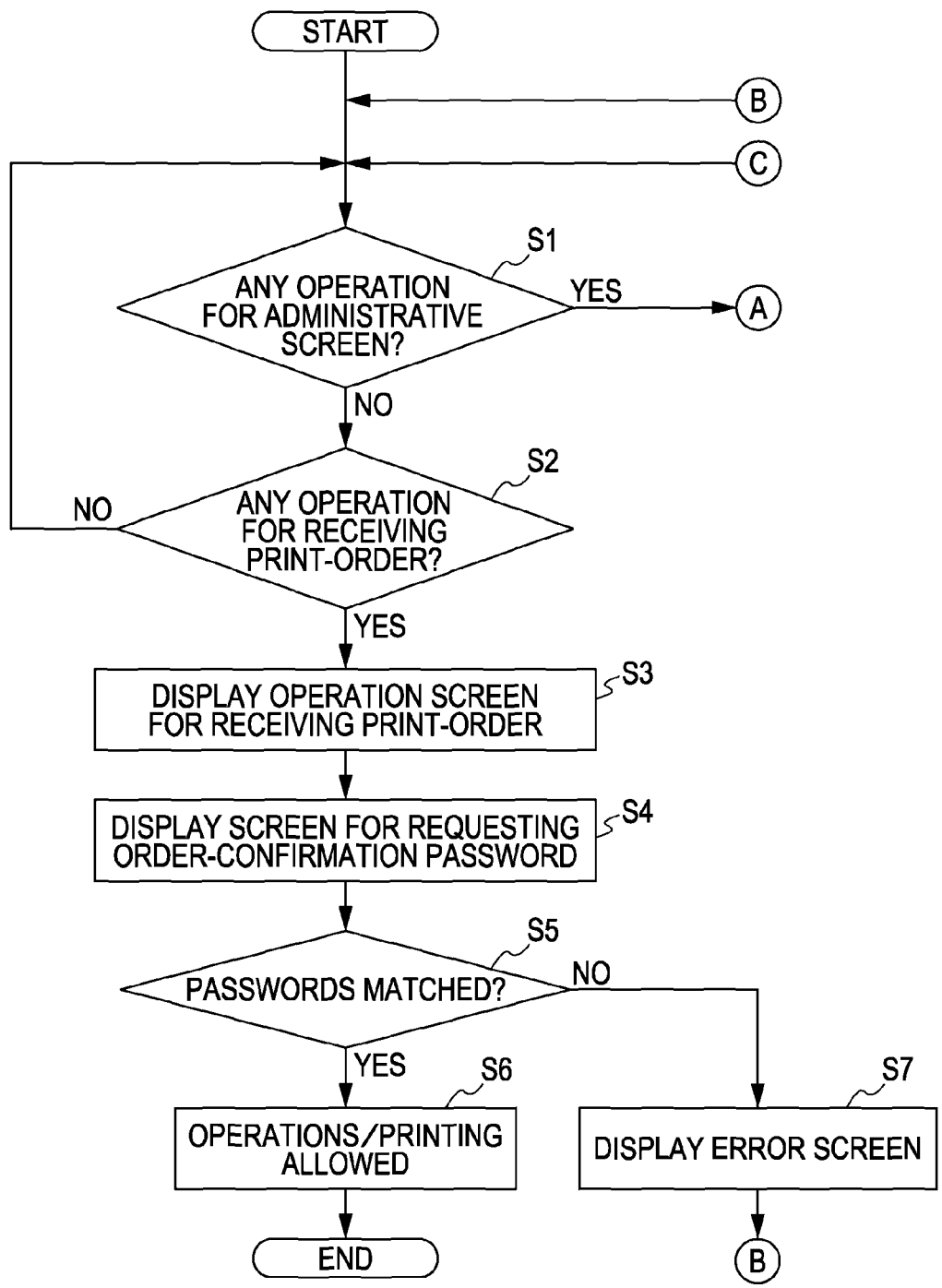
FIG. 4 is a flowchart showing processing of receiving a print-order.

FIG. 4 shows a sequence of operations performed at the time of receiving a print-order.

The control unit 21 performs determination processing of steps S1 and S2 repeatedly while waiting for operation instructions to be input (while displaying a standby screen).

Step S1 is for determining whether or not an input operation instruction is intended for operating the administrative screen. Step S2 is for determining whether or not the input operation instruction is intended for an order receiving operation.

If the input operation instruction is determined to be that for the order receiving operation in step S2, the control unit 21 displays a print-order receiving operation screen on the display 25 (step S3).

After this, the memory card 41 storing image data is inserted into the memory card slot 7 by the user in accordance with guidance shown on the display screen. Moreover, order receiving operations that include selecting an image, a print size, and the number of printouts are performed by the user. The print-order receiving operation screen for the order receiving operations is the same as the existing input screen.

In the first embodiment, after the completion of inputting bare minimum information, the password requesting unit 33 displays a screen for requesting the order-confirmation password on the display 25 via the control unit 21 (step S4). FIG. 5 shows an example of such an input-screen. In FIG. 5, input operation instructions are shown on the left part of the screen, and an operation screen 61 for inputting a password is shown on the right part of the screen.

As a matter of course, a password can be directly entered through the operation screen 61. However, in the first embodiment, the password is read from the memory card 43 which is newly inserted into the memory card slot 7 or the card reader (not shown) while such an operation screen 61 is displayed, which avoids the password having to be entered manually. The memory card 43 is another recording medium, which is given by the administrator as described above, provided in addition to the memory card 41 in which image data is stored.

After the password is read, the print-determination unit 39 checks the read password against the order-confirmation password stored in the password memory unit 37, and determines whether or not the read password and the order-confirmation password match (step S5).

If these passwords match, the control unit 21 determines that the user is authorized, and allows the user to perform various further operations or printing (step S6).

Figure 6:
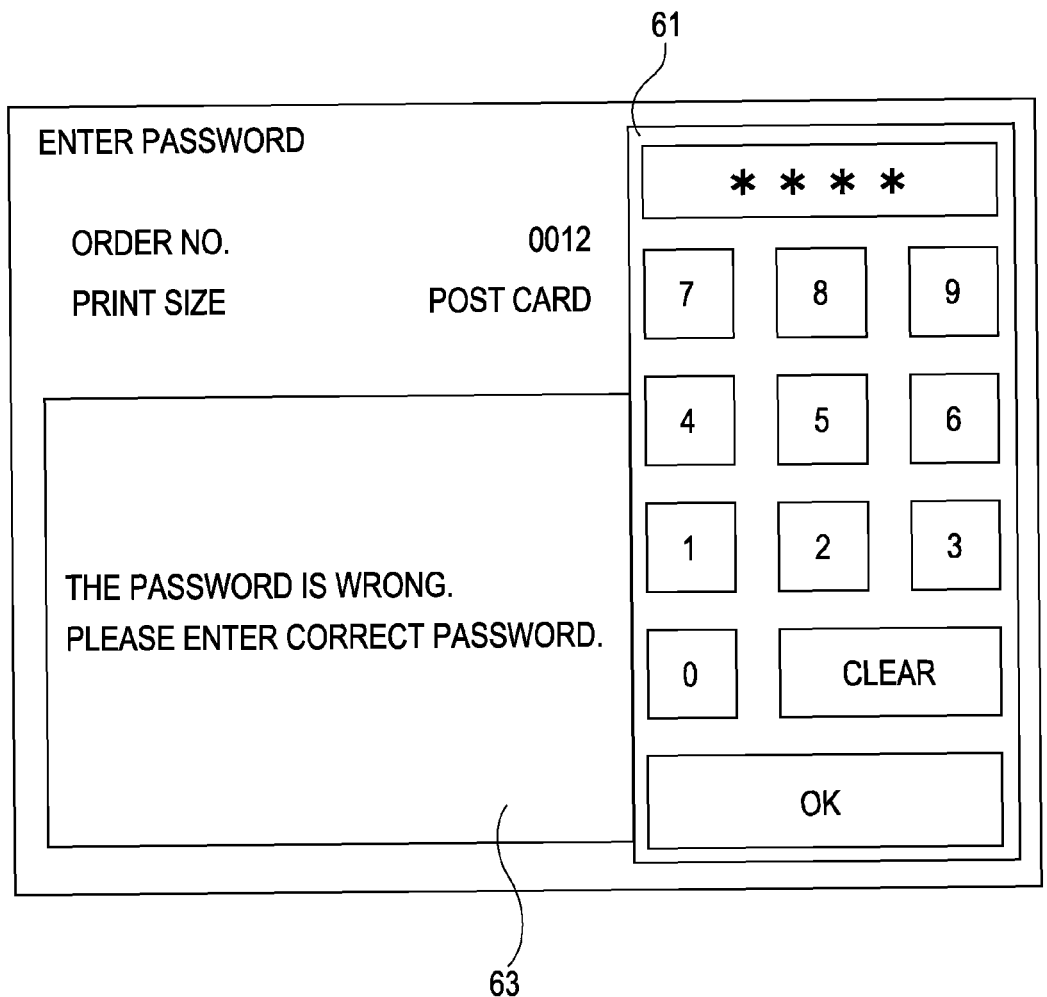
FIG. 6 is a view showing an example of a screen in the case where the password is wrong.

In contrast, if these passwords do not match, the control unit 21 determines that the user is unauthorized, and displays a password-reentry requesting screen on the display 25 (step S7). FIG. 6 shows an example of such a display screen. In FIG. 6, a warning window 63 is displayed on the left part of the screen.

Here, if another memory card is newly inserted or a password is newly input, the control unit 21 controls the print-determination unit 39 to check the newly obtained password against the order-confirmation password again.

If the reentered password still does not match the order-confirmation password, the control unit 21 terminates the order receiving processing, and returns to the standby screen.

(b) Administrative Screen Display Processing

Figure 7:
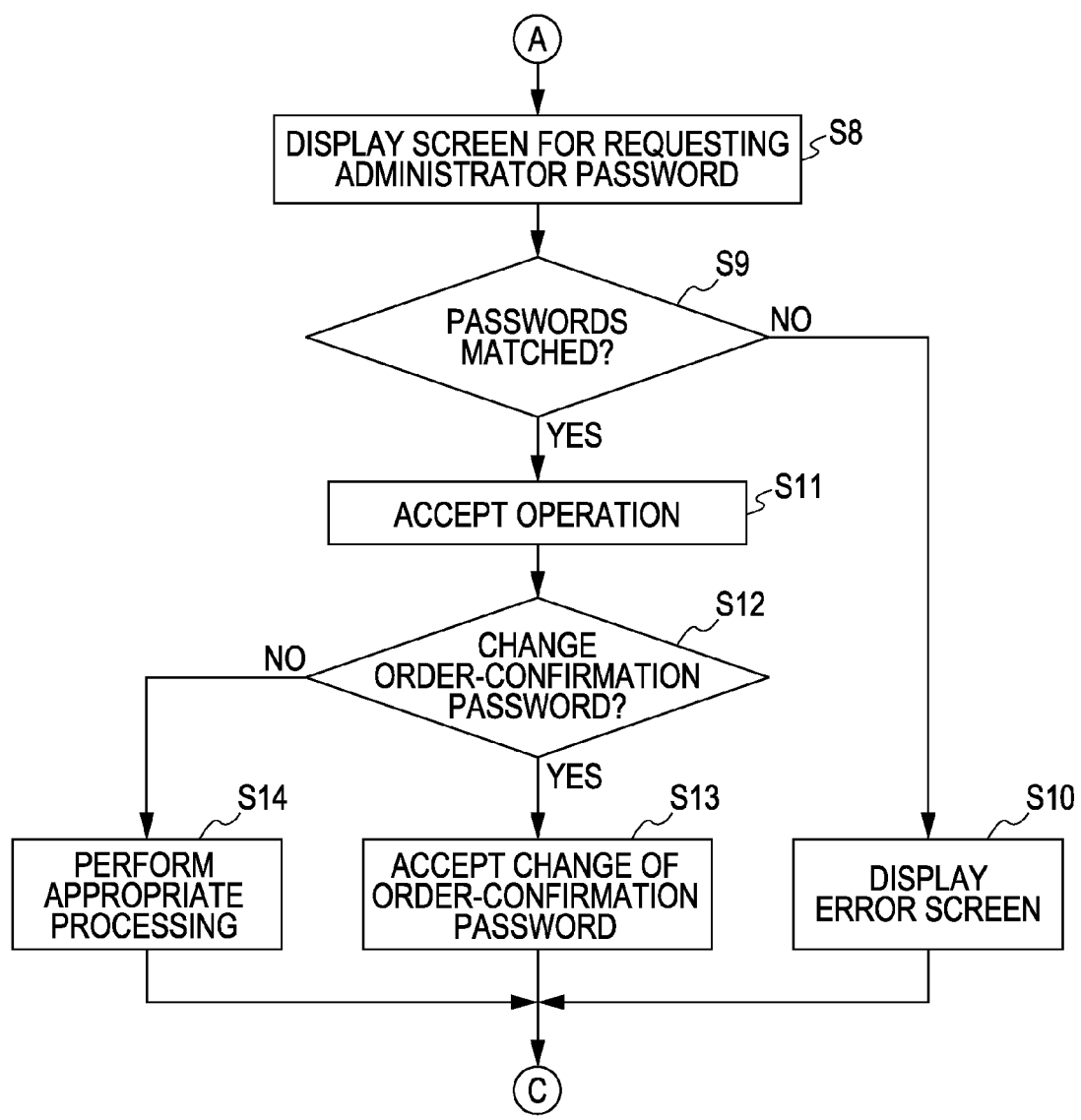
FIG. 7 is a flowchart showing processing of displaying an administrative screen.

FIG. 7 shows processing operations in the case where the input operation instruction is determined to be that for operating the administrative screen in step S1. If the user has selected to display the administrative screen, the password requesting unit 33 displays the screen for requesting an administrator password on the display 25 via the control unit 21 (step S8).

The user inputs an administrator password by inserting the memory card 43, which is expressly meant for storing the administrator password, into the memory card slot 7 or by manual entry.

After the completion of inputting the administrator password, the print-determination unit 39 checks the input password against the administrator password stored in the password memory unit 37, and determines whether these passwords match or not (step S9).

If the passwords do not match, the control unit 21 determines that the user is not the administrator, and displays an error screen (step S10). As a matter of course, a password-reentry requesting screen may also be displayed on the display 25.

If the passwords match, the control unit 21 determines that the user is the administrator, and enters a state where further input operation instructions can be accepted (step S11).

If an operation instruction of some kind is detected, the control unit 21 determines the function of the operation instruction. In FIG. 7, the control unit 21 first determines whether the operation instruction is for changing the order-confirmation password or not (step S12).

Here, if the operation instruction is determined to be that for changing the order-confirmation password, the control unit 21 starts processing for accepting changing of the order-confirmation password to a new order-confirmation password (step S13).

Figure 8:
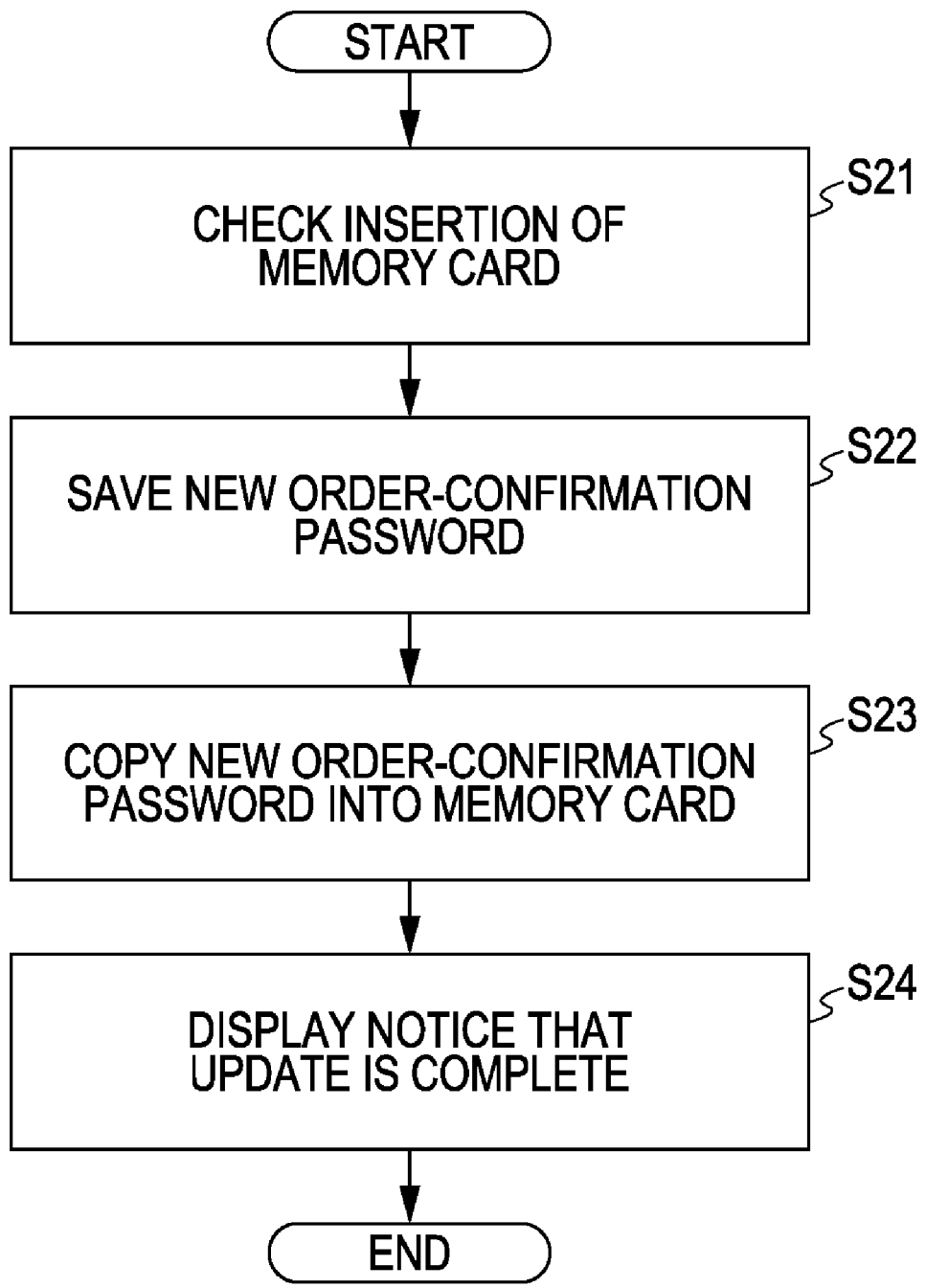
FIG. 8 is a flowchart showing a procedure of accepting changing of an order-confirmation password.

FIG. 8 shows details of processing operations performed in step S13. First, the control unit 21 checks whether the memory card 43 is inserted into the memory card slot 53 disposed inside the ink-ribbon door panel 11 (step S21).

Then, the control unit 21 changes the order-confirmation password stored in the password memory unit 37 to the new order-confirmation password (step S22). That is, the data saved in the password memory unit 37 is updated. In addition, the control unit 21 copies the new order-confirmation password into the memory card 43 inserted in the memory card slot 53 (step S23).

Such copying can be performed repeatedly to a necessary number of memory cards.

After such processing, the control unit 21 displays a notice that the update has been completed on the display 25 (step S24).

Incidentally, if the operation instruction is determined to be not that for changing the order-confirmation password in step S12, the control unit 21 performs appropriate processing in accordance with the input operation instruction (step S14).

In the case of the printing apparatus 1 described above, input of the order-confirmation password, which is requested when the printing apparatus 1 is to be used, can be achieved by inserting the memory card 43. Thus, there is no necessity to enter the order-confirmation password manually in front of the public, and confidentiality of the order-confirmation password can be more properly secured.

Moreover, the administrator just gives the memory card 43 storing the order-confirmation password to each of the authorized users. Thus, a burden of the administrator can be largely lightened compared to a method of the related art in which the administrator manually enters the order-confirmation password while being concerned about the confidentiality of the password.

The order-confirmation password is stored in the memory card 43 expressly meant therefor, and controlled independently of the administrator password.

Thus, even if the order-confirmation password is lost or stolen, administrative information of the printing apparatus 1 used in a standalone state can be protected from unauthorized persons.

In addition, the order-confirmation password can be changed only if the administrator password is authenticated in a state where the memory card 43 is inserted into the memory card slot 53 disposed inside the ink-ribbon door panel 11, which is usually closed except at the time of maintenance. Thus, the consistency of the order-confirmation password can be ensured both in the printing apparatus 1 and in the memory card 43.

The memory card slot 53, which is usable at the time of changing the order-confirmation password, is disposed in a location which is difficult for general users to see. Thus, it is difficult to change the order-confirmation password fraudulently even if the administrator password is used fraudulently. Here, if a logical or physical lock mechanism is mounted on the ink-ribbon door panel 11, it becomes even more difficult to change the order-confirmation password fraudulently.

Furthermore, by inputting the administrator password with the use of the memory card 43 (another memory card provided in addition to the memory card storing the order-confirmation password) storing the administrator password, confidentiality of the administrator password can be more properly secured even if the administrator works in front of the public.

Other Embodiments (a) In the first embodiment, the order-confirmation password is changed arbitrarily by the administrator.

However, an update of the order-confirmation password may be requested primarily by a printing apparatus used as a print-order receiving apparatus. This allows more frequent updating of the order-confirmation password, and can reduce the possibility of unauthorized use.

Figure 9:
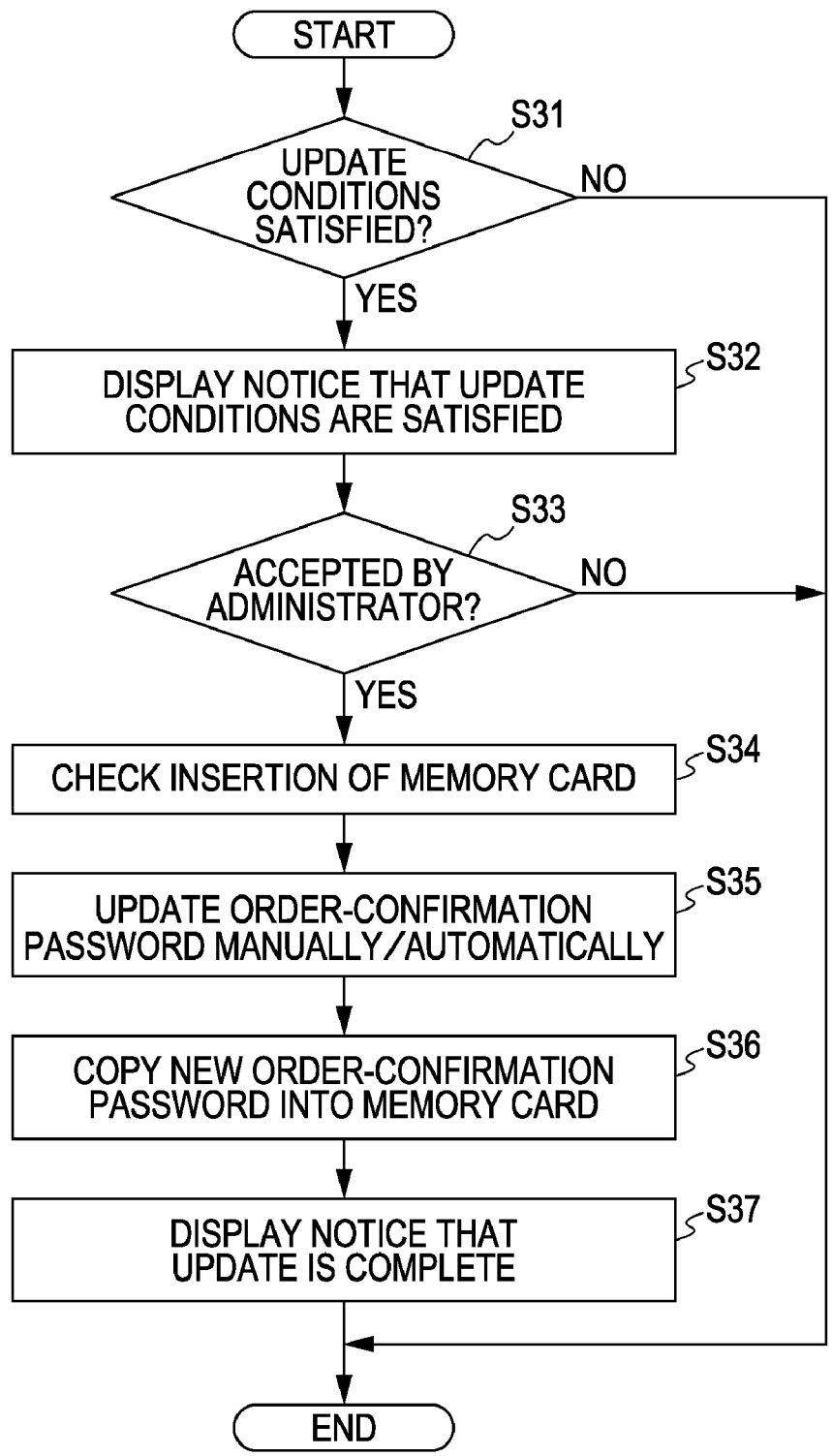
FIG. 9 is a flowchart showing an update requesting function for the order-confirmation password.

FIG. 9 shows an exemplary processing sequence in order to achieve such an update requesting function. For example, the processing sequence shown in FIG. 9 is executed at the time of the administrator password being authenticated. The administrator may also access the administrative screen for purposes besides changing the order-confirmation password; however, if such a program is executed when the administrator accesses the administrative screen, the order-confirmation password can be more frequently updated.

When such an update requesting function is performed, the control unit 21 determines whether update conditions are satisfied or not (step S31). Examples of the update conditions include a time, an elapsed time from the last update, and a usage count from the last update. It is desirable that the conditions be set arbitrarily by the administrator through the administrative screen.

If the update conditions are not satisfied, the control unit 21 terminates the update requesting function.

In contrast, if the update conditions are satisfied, the control unit 21 shows a notice that the update conditions are satisfied on the display 25 (step S32). Such a notice can encourage more frequent updating of the order-confirmation password than just relying on the administrator to arbitrarily perform updates.

Then, the control unit 21 determines whether the administrator accepts the update of the order-confirmation password (step S33). Step S33 is provided in order to reflect the administrator's will.

Therefore, if the administrator does not want to update the order-confirmation password ("NO" in step S33), the control unit 21 terminates the update requesting function.

In contrast, if the administrator wants to update the order-confirmation password ("YES" in step S33), the control unit 21 checks whether the memory card 43 is inserted into the memory card slot 53 disposed inside the ink-ribbon door panel 11 (step S34).

Then, the control unit 21 changes the order-confirmation password stored in the password memory unit 37 to a new order-confirmation password that is manually entered by the administrator or generated automatically (step S35). For example, a random number generator may be used in the case of automatically generating the new order-confirmation password.

Then, the control unit 21 copies the updated order-confirmation password to the memory card 43 inserted into memory card slot 53 (step S36).

Such copying can be performed repeatedly to a necessary number of memory cards.

After such processing, the control unit 21 displays a notice that the update has been completed on the display 25 (step S37).

(b) In the first embodiment, as shown in FIG. 10A, the order-confirmation password is a single string of numerals and/or characters (a password).

However, as shown in FIG. 10B, the order-confirmation password may be a single string which includes a plurality of strings of numerals and/or characters (passwords).

FIG. 10B shows an example in which the order-confirmation password includes an invariable password and a variable password. Here, the invariable password is a part of the order-confirmation password, and is not changed even if the order-confirmation password is updated. For example, the administrator password is used as the invariable password.

The variable password is also a part of the order-confirmation password, and can be changed when the order-confirmation password is updated. As a matter of course, the variable password can be updated only in a state where the administrator password is authenticated.

(c) In the first embodiment, when a print-order is received, a print size and the number of sheets are input.

However, other information may be input in addition to these. For example, a budget code may be input. FIG. 11 shows an example of a print-order receiving operation screen in the case where a budget code is input. FIG. 11 shows a confirmation screen for a print-order in a printing queue. FIG. 11 shows the case where the budget codes are "001" and "003".

Such budget codes are usually used to control the maximum number of sheets to be printed or sum the total usage charge for each of the codes.

Figure 12:
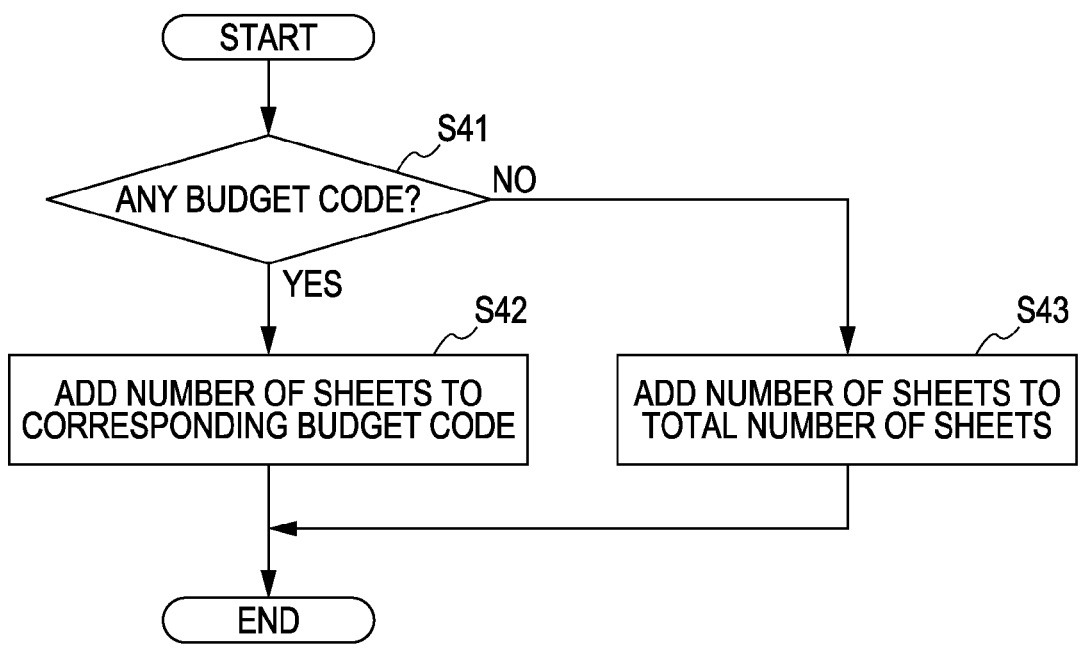
FIG. 12 is a flowchart showing a procedure at the time of inputting a budget code.

FIG. 12 shows an example of a processing sequence for the printing apparatus 1 which corresponds to input of the budget codes. Here, the processing sequence is executed at the time of a print-order being received.

In this case, the control unit 21 determines whether or not a budget code has been input when a print-order is received (step S41). The budget code may be input not only by manually entering the code from the operation screen but also by reading out the code, together with the order-confirmation password, from the memory card 43.

If the budget code is determined to have been input in step S41, the control unit 21 adds the input number of sheets to the number of sheets associated with the corresponding budget code (step S42). In contrast, if the budget code is determined not to have been input in step S41, the control unit 21 adds the input number of sheets to the total number of sheets (step S43).

(d) In the first embodiment, the memory card slot 53, which is expressly meant for password-updating, is disposed inside of the ink-ribbon door panel 11.

However, a slot used for password-updating may be disposed inside other doors (for example, inside the roll-paper door panel 5). Furthermore, the password-updating may be performed using the memory card slot 7 or an external card writer.

(e) In the first embodiment, the memory card slot 7 accepts a Memory Stick®, an XD card, an SD card, a SmartMedia card, and a CompactFlash® card.

However, other memory devices including a USB memory may be used. Furthermore, not only a memory card but also a central processing unit (CPU) card having a CPU may be used.

Note that such memory devices can be applied to not only contact type cards having external terminals but also non-contact type cards having internal antennas. The non-contact type cards can be classified into a very-short-range type, a short-range type, an intermediate-range type, and a long-range type in accordance with a communication range thereof. The memory device can be applied to any of the types.

(f) In the first embodiment, the printing apparatus 1 is usable in a standalone state.

However, this does not mean that the printing apparatus 1 does not have a network interface mounted thereon. A printing apparatus with a network interface can also be used.

(g) In the above description, a dye-sublimation printing device is mounted as a printing device.

However, any printing device can be used as the printing device. Such a printing device may be, for example, a printing device that forms images by an inkjet method or a printing device, such as a laser printer, that includes a laser source, a photoconductor drum, and other mechanisms.

(h) In the first embodiment, the printing apparatus is described such that all processing functions are achieved by software processing.

However, the processing functions can be achieved by sharing the processing functions partially or entirely with hardware. In addition, all of the processing functions can be achieved with hardware (an application-specific integrated circuit (ASIC)).

In terms of the embodiments described above, various modifications can be conceived within the scope of the invention. It should be understood by those skilled in the art that various modifications, combinations, sub-combinations and alterations may occur depending on design requirements and other factors insofar as they are within the scope of the appended claims or the equivalents thereof.

What is claimed is:

1. A print-order receiving apparatus comprising:
a first memory unit for storing an administrator password used to determine whether or not to allow access to administrative information;
a second memory unit for storing an order-confirmation password used to determine whether or not to perform printing;
a first data-reading unit for reading image data from a first portable recording medium;
a password requesting unit for requesting the order-confirmation password via a touch-panel display having a manual password input screen during an operation of receiving a print-order regarding the read image data, the manual password input screen being a data entry displayed on the touch-panel display operable to receive data entry via touch selection;
a second data-reading unit for automatically reading password data from a second portable recording medium when inserted into a first slot of the printing apparatus visible to users (i) when the order-confirmation password is requested, (ii) while the manual password input screen is displayed on the touch-panel display, and (iii) in response to the first portable recording medium communicating with the first data-reading unit; and
a print-determination unit for checking whether the read password data and the order-confirmation password match and for determining whether or not to print the image data,
wherein,
the administrative password is received using a second slot of the printing apparatus not visible to users.

2. The print-order receiving apparatus according to claim 1, wherein the first and second data-reading units are contact type interfaces.

3. The print-order receiving apparatus according to claim 1, wherein the first or second data-reading unit is a non-contact type interface.

4. The print-order receiving apparatus according to claim 1, wherein the second data-reading unit is mounted on an external apparatus that is connectable to the print-order receiving apparatus.

5. The print-order receiving apparatus according to claim 1, further comprising a data-writing unit for copying a new order-confirmation password into the second portable recording medium if the order-confirmation password is changed to the new order-confirmation password in a state where the administrator password is authenticated.

6. The print-order receiving apparatus according to claim 5, wherein an opening for mounting the data writing unit is provided in the housing and protected by a door.

7. The print-order receiving apparatus according to claim 1, wherein the order-confirmation password includes a plurality of sub-passwords.

8. The print-order receiving apparatus according to claim 7, the plurality of sub-passwords includes one invariable password and one variable password.

9. The print-order receiving apparatus according to claim 8, the variable password is updated in a state where the administrator password is authenticated.

10. The print-order receiving apparatus according to claim 1, wherein an administrator is prompted to update the order-confirmation password in response to update conditions being met and in response to the administrator password being received, the order-confirmation password is updated to one or more portable recording mediums including the second portable recording medium in response to a selection by the administrator to update the order-confirmation password and the one or more portable recording mediums being inserted in the first slot of the printing apparatus.

11. A printing apparatus comprising:
    a touch-panel display for displaying an operation screen with a manual password input screen, the manual password input screen being a data entry displayed on the touch-panel display operable to receive data entry via touch selection;
    a printing device for forming a print image on a print medium;
    a first memory unit for storing an administrator password used to determine whether or not to allow access to administrative information;
    a second memory unit for storing an order-confirmation password used to determine whether or not to perform printing;
    a first data-reading unit for reading image data from a first portable recording medium;
    a password requesting unit for requesting the order-confirmation password during an operation of receiving a print-order regarding the read image data;
    a second data-reading unit for automatically reading password data from a second portable recording medium when inserted into a first slot of the printing apparatus visible to users (i) when the order-confirmation password is requested, (ii) while the manual password input is displayed on the touch-panel display, and (iii) in response to the first portable recording medium communicating with the first data-reading unit; and
    a print-determination unit for checking whether the read password data and the order-confirmation password match and for determining whether or not to print the image data,
    wherein,
    the administrative password is received using a second slot of the printing apparatus not visible to users.

12. The printing apparatus according to claim 10, wherein an administrator is prompted to update the order-confirmation password in response to update conditions being met and in response to the administrator password being received, the order-confirmation password is updated to one or more portable recording mediums including the second portable recording medium in response to a selection by the administrator to update the order-confirmation password and the one or more portable recording mediums being inserted in the first slot of the printing apparatus.

13. A print-order receiving method comprising the steps of:
    reading image data from a first portable recording medium;
    requesting an order-confirmation password via a touch-panel display having a manual password input screen during an operation of receiving a print-order regarding the read image data, the manual password input screen being a data entry displayed on the touch-panel display operable to receive data entry via touch selection;
    automatically reading password data from a second portable recording medium when inserted into a first slot of the printing apparatus visible to users (i) when the order-confirmation password is requested, (ii) while the manual password input screen is displayed on the touch-panel display, and (iii) in response to the first portable recording medium being inserted in a printer;
    receiving an administrative password using a second slot not visible to users;
    checking whether the read password data and the order-confirmation password match; and
    determining whether or not to print the image data.

14. A non-transitory computer-readable medium having stored thereon a computer program which causes a computer to perform the steps of:
    reading image data from a first portable recording medium;
    requesting an order-confirmation password via a touch-panel display having a manual password input screen during an operation of receiving a print-order regarding the read image data, the manual password input screen being a data entry displayed on the touch-panel display operable to receive data entry via touch selection;
    automatically reading password data from a second portable recording medium when inserted into a first slot of the printing apparatus visible to users (i) when the order-confirmation password is requested, (ii) while the manual password input screen is displayed on the touch-panel display, and (iii) in response to the first portable recording medium being inserted in a printer;
    receiving an administrative password using a second slot not visible to users;
    checking whether the read password data and the order-confirmation password match; and
    determining whether or not to print the image data.

15. The print-order receiving method according to claim 14 further comprising:
    prompting an administrator to update the order-confirmation password in response to update conditions being met and in response to the administrator password being received; and
    updating the order-confirmation to one or more portable recording mediums including the second portable recording medium in response to a selection by the administrator to update the order-confirmation password and the one or more portable recording mediums being inserted in the first slot of the printing apparatus.

* * * * *